United States Patent
Oezcoban et al.

(10) Patent No.: US 10,471,674 B2
(45) Date of Patent: Nov. 12, 2019

(54) FILING APPARATUS FOR A ROTARY PRESS

(71) Applicant: Fette Compacting GmbH, Schwarzenbek (DE)

(72) Inventors: Hueseyin Oezcoban, Hamburg (DE); Thomas Heinrich, Stelle (DE); Thorsten Ehrich, Witzhave (DE)

(73) Assignee: Fette Compacting GmbH, Schwarzenbek (DE)

( * ) Notice: Subject to any disclaimer, the term of this patent is extended or adjusted under 35 U.S.C. 154(b) by 155 days.

(21) Appl. No.: 15/617,502

(22) Filed: Jun. 8, 2017

(65) Prior Publication Data

US 2017/0355162 A1 Dec. 14, 2017

(30) Foreign Application Priority Data

Jun. 8, 2016 (DE) .................. 10 2016 110 556

(51) Int. Cl.
| | |
|---|---|
| *B30B 15/30* | (2006.01) |
| *B01F 7/00* | (2006.01) |
| *B01F 7/16* | (2006.01) |
| *B30B 11/08* | (2006.01) |

(Continued)

(52) U.S. Cl.
CPC ........ *B30B 15/308* (2013.01); *B01F 7/00291* (2013.01); *B01F 7/00641* (2013.01); *B01F 7/166* (2013.01); *B30B 11/003* (2013.01); *B30B 11/08* (2013.01); *B30B 15/302* (2013.01); *B01F 2215/0032* (2013.01); *B29C 31/047* (2013.01); *B30B 15/304* (2013.01)

(58) Field of Classification Search
CPC ..... B30B 11/08; B30B 15/302; B30B 15/304; B29B 9/10; B29C 31/04; B29C 31/047; B01F 7/00641; B01F 7/166
See application file for complete search history.

(56) References Cited

U.S. PATENT DOCUMENTS

| | | | |
|---|---|---|---|
| 1,686,804 | A | 10/1928 | Files |
| 3,225,713 | A | 12/1965 | Kruse |

(Continued)

FOREIGN PATENT DOCUMENTS

| | | |
|---|---|---|
| CN | 104228126 A | 12/2014 |
| DE | 1427422 A | 11/1968 |

(Continued)

OTHER PUBLICATIONS

EP 3260286; dated Dec. 27, 2017; European Search Report; dated Nov. 23, 2017 (7 pages).

*Primary Examiner* — James P Mackey
(74) *Attorney, Agent, or Firm* — Barclay Damon LLP

(57) ABSTRACT

A filling apparatus comprises a filling material reservoir and a filling chamber that is connected to the filling material reservoir with a filling opening configured to dispense filling material into cavities in the rotary press. A first rotatably driven stirrer blade wheel with one or more stirrer blades and a second rotatably driven stirrer blade wheel with one or more stirrer blades are arranged in the filling chamber. The first rotatably driven stirrer blade wheel has at least one of a different geometry, a different direction of rotation, or a different rotary speed, than the second rotatably driven stirrer blade wheel.

10 Claims, 1 Drawing Sheet

(51) Int. Cl.
*B30B 11/00* (2006.01)
*B29C 31/04* (2006.01)

(56) References Cited

U.S. PATENT DOCUMENTS

| | | | | |
|---|---|---|---|---|
| 3,823,837 | A | * | 7/1974 | Wennberg ............... B65D 88/68 414/325 |
| 9,327,469 | B2 | | 5/2016 | Heinrich et al. |
| 9,902,087 | B2 | * | 2/2018 | Ozeki ..................... B30B 11/08 |

FOREIGN PATENT DOCUMENTS

| | | | |
|---|---|---|---|
| DE | 10215263 | A1 | 10/2003 |
| EP | 2353852 | A2 | 8/2011 |
| EP | 3260286 | A1 | 12/2017 |
| JP | S56-139 752 | A | 10/1981 |
| KR | 20010037750 | A | 5/2001 |
| KR | 1020010037750 | A | 5/2001 |
| WO | WO 2015/186905 | * | 12/2015 |

* cited by examiner

FILING APPARATUS FOR A ROTARY PRESS

CROSS REFERENCE TO RELATED INVENTION

This application is based upon and claims priority to, under relevant sections of 35 U.S.C. § 119, German Patent Application No. 10 2016 110 556.2, filed on Jun. 8, 2016.

BACKGROUND

The invention relates to a filling apparatus for filling cavities in a rotary press comprising a filling material reservoir and a filling chamber that is connected to the filling material reservoir and has a filling opening from which the filling material can pass into the cavities of the rotary press.

By means of a filling apparatus, the cavities of a rotary press are filled, metered, and/or pre-compressed with the pressing material to be pressed by the punch of the rotary press. The upper and bottom punches of the rotary press interact in the cavities to press pellets. The quality of the produced pellets depends significantly on the quality of cavity filling. Features that are examined when determining the quality of the produced pellets are, for example, the pellet weight, breaking strength, density distribution and amount of active ingredient. Reproducible pellet quality is an important manufacturing characteristic according to the pharmacopoeia and requires a reproducible cavity filling quality. The cavity filling quality can, for example, be understood as the degree of fluctuation of the fill amounts and/or the density distribution of the pressing material within a single cavity and/or the integrity of the pressing material. For example, a small fluctuation range of the fill amounts can ensure an even weight of all the produced pellets.

The filling apparatuses must ensure that the cavity filling quality is retained even with the high performance of today's rotary presses. Known filling apparatuses are based on different concepts such as chamber filling shoes and single or multi-chamber filling systems. Frequently, stirrer blade wheels are rotatably driven in the filling chambers of the filling apparatuses. Stirrer blade wheels are used in particular for high performance rotary presses. Stirrer blades with different numbers and shapes of stirrer blades are known. Pressing material is continuously transported by the rotary blades to the cavities so that, even at high speeds, the rotary press ensures the availability of a sufficient amount of pressing material to fill the cavities. Moreover, the stirrer blades loosen the pressing material which positively influences the flowability. This allows a consistent cavity filling quality to be ensured even at a high tableting output.

The effect of the stirrer blades of the stirrer blade wheels on the cavity filling quality is dependent inter alia on the pressing material to be pressed. The stirrer blades can have a significant influence on the transported amount of pressing material, and/or on the extent to which bridge formation is prevented, and/or loosening. In addition, by selecting appropriate stirrer blades, disadvantageous effects can be prevented such as a decomposition or heating of the pressing material. It is, however, difficult to find a stirrer blade configuration that realizes all of the various goals. For example, a certain stirrer blade configuration can ensure an effective transportation of the pressing material to the cavities. However, it does not offer satisfactory loosening of the pressing material at all times. Conversely, a stirrer blade configuration that, for example, ensures effective loosening of the pressing material may not ensure satisfactory transportation of the pressing material to the cavities. A conflict between goals accordingly exists in practice.

Based on the presented prior art, the object of the invention is therefore to provide a filling apparatus of the aforementioned type which also satisfactorily meets various requirements with regard to cavity filling.

BRIEF SUMMARY OF THE INVENTION

For a filling apparatus of the aforementioned type, the invention achieves the object in that a first rotatably driven stirrer blade wheel with stirrer blades and a second rotatably driven stirrer blade wheel with stirrer blades are arranged in the filling chamber, wherein the first and second rotatably driven stirrer blade wheel differ in terms of their geometry, and/or their direction of rotation, and/or their rotary speed.

The filling apparatus according to the invention is provided for use in a rotary press, in particular a rotary tablet press. The rotary press can also be a multiple rotary press, in particular, a double rotary press. A plurality of, in particular two filling apparatuses, pressing stations, ejector stations, or other suitable components are then provided. This is known per se. The rotor of such a rotary press possesses a rotary drive that rotatably drives the rotor, in particular the die plate with the upper and lower punches, for example by means of a drive shaft at the rotor rotary speed. The die plate can be designed as a single piece or be constructed from individual die segments. The cavities can be formed by holes introduced directly in the die plate, or by releasable dies inserted in seats in the die plate. In the filling apparatus, the cavities of the die plate are filled with a filling material such as a powder. Then the filling material is pressed within the cavities in a known manner by the top and bottom punch of the rotary press in the cavities into a pellet, especially a tablet. After the pellets are expelled from the cavities, for example by the bottom punch of the rotary press, the pellet is ejected from the rotary press in an ejector station. The ejector station can, for example, comprise a scraper arranged directly above the die plate which scrapes off the ejected pellets from the die plate passing below the scraper toward a discharge channel.

The filling apparatus comprises a filling material reservoir that, for example, can be connected by a feed section to the filling chamber. The filling material passes from the filling material reservoir, for example via the feed section, into the filling chamber, in particular under the force of gravity. The filling material reservoir can be designed in the shape of a funnel. When the rotary press is in an installed state, the filling chamber is located directly above the die plate so that, during operation, filling material from the filling chamber can fall through the filling opening, in particular under the force of gravity, into the cavities of the die plate rotating below the filling chamber. In an embodiment, the filling chamber can be a filling shoe.

According to the invention, at least two rotationally driven stirrer blade wheels are arranged in the filling chamber of the filling apparatus. The stirrer blade wheels each possess stirrer blades. The filling apparatus possesses one or more rotary drives that rotatably drive the stirrer blade wheel or respectively, wheels. The stirrer blades of the stirrer blade wheels are arranged around the perimeter of the stirrer blades wheels and rotate in the filling chamber filled with the filling material. The first and second stirrer blades differ in terms of their geometry, and/or their direction of rotation, and/or rotary speed. In particular, the geometry of the stirrer blades of the first and second stirrer blades wheel can differ. In an embodiment, the stirrer blades can possess different cross-sections. In another embodiment, the stirrer blades of one stirrer blade wheel can be thicker than the stirrer blades of the other stirrer blade wheel. The direction of rotation, or respectively the rotary speed and in particular the geometry of the stirrer blades influence the availability and flowability of the filling material to different degrees. The selection of the stirrer blade configuration to be used depends on the nature of the filling material to be pressed. By providing, according to the invention, at least two stirrer blade wheels of a different configuration in a filling chamber, the advantages of different stirrer blade configurations, in particular stirrer blade geometries, can be combined with each other. It is therefore possible to solve the existing conflict between the goals in the prior art when using only one stirrer blade wheel in a filling chamber. In this manner, a reliably consistent quality of the cavity filling and hence of the pellets can be achieved, even at high speeds of the rotary press rotor and correspondingly very high press outputs.

The first stirrer blade wheel and the second stirrer blade wheel can be arranged superimposed in the filling chamber. It is moreover possible to rotatably drive the first stirrer blade wheel and the second stirrer blade wheel on concentric rotary shafts. It is conceivable in an embodiment for one of the stirrer blades to be rotatably driven on a hollow shaft in which the rotary shaft of the other stirrer blade wheel is independently rotatably arranged. It is of course also possible for both stirrer blade wheels to be rotatably driven on the same rotary shaft.

The stirrer blades of one of the first and second stirrer blade wheel can be made of a flat bar, and the stirrer blades of the other of the first and second stirrer blade wheel can be made of a round bar. With some filling materials, more filling material can be transported to the cavities for example by a rectangular cross-section of the stirrer blades, however the filling material is not always sufficiently loosened. Such a loosening is contrastingly achieved with such filling materials by a round cross-section of the stirrer blades, which however do not always ensure sufficient transportation of the filling material to the cavities. By combining for example a rectangular cross-section of stirrer blades of one stirrer blade wheel with a round cross-section of the stirrer blades of the other stirrer blade wheel, optimum transportation and loosening of filling material, and hence optimum availability of filling material can always be ensured for filling the cavities without significantly increasing the rotary speed of the stirrer blade wheels. Increasing the mechanical load on the filling material by strongly increasing the rotary speed of the stirrer blade wheel which is necessary in the prior art is thereby avoided. For example, when the stirrer blade wheels are arranged superimposed, the stirrer blade wheel with the stirrer blades made of a round bar can be arranged in the filling chamber above the agitator blade wheel with the stirrer blades made of a flat rod. The above-explained combination of the effects of stirrer blades is thereby exploited to particular advantage.

According to another embodiment, the stirrer blades of the first and/or second stirrer blades wheel can each lie in a preferably horizontal plane. In a cross-section through the stirrer blade wheel, they lie in particular in a preferably horizontal plane. The stirrer blades of a stirrer blade wheel can each be connected to the rotary shaft of the stirrer blade wheel at the same height and not have any changes in direction over their length in this embodiment such as curvatures or offsets, in particular in the direction of the rotary shaft.

It is also possible for the stirrer blades of the first and/or second stirrer blade wheel not to lie in a preferably horizontal plane, in particular in a cross-section through the stirrer blade wheel. Moreover, the stirrer blades can be connected to the rotary shaft of the stirrer blade wheel at the same height. They then possess one or more changes in direction over their length such as curvatures or offsets, etc., in particular in the direction of the rotary shaft. In particular, a combination of the aforementioned embodiments is also possible, i.e., the stirrer blades of one of the first and second stirrer blade wheel lie in such a plane, and the stirrer blades of the other of the first and second stirrer blade wheel do not lie in such a plane. For example when the stirrer blade wheels lie superimposed in the filling chamber, the stirrer blade wheel whose stirrer blades do not lie in a plane can be arranged above the stirrer blade wheel whose stirrer blades lie in a plane.

According to another embodiment, at least one third rotatably driven stirrer blade wheel can be arranged in the filling chamber, wherein the at least one third stirrer blade wheel can differ from the first and/or second stirrer blade wheel in terms of its geometry, and/or its direction of rotation, and/or its rotary speed. With respect to this stirrer blade wheel, the same embodiments can exist as explained above with regard to the first and/or second stirrer blade wheel.

At least one additional filling chamber of the filling apparatus can be provided above or to the side of the (first) filling chamber. At least one additional rotatably driven stirrer blade wheel can be arranged in the least one additional filling chamber.

Moreover, a control apparatus can be provided that controls the rotary speed and/or the direction of rotation of the first and the second stirrer blade wheel. In an embodiment, this can be the machine control of the rotary press. Of course, the control apparatus can also correspondingly control other provided stirrer blade wheels, if applicable.

The invention also relates to a rotary press comprising a rotor that can be rotated by means of a rotary drive, wherein the rotor has an upper punch guide for upper press punches of the rotary press, a lower punch guide for lower press punches of the rotary press and a die plate arranged between the punch guides, wherein the press punches interact with cavities in the die plate. The disclosed rotary press may further comprise a filling apparatus configured to dispense the filling material into the cavities in the die plate. At least one upper pressing apparatus and at least one lower pressing apparatus are configured to interact with the upper press punches and the lower press punches during operation such that they press the filling material into the cavities in the die plate An ejection apparatus is configured to eject the pellets generated in the cavities. The rotary press can be designed in principle as explained above.

BRIEF DESCRIPTION OF THE DRAWINGS

An exemplary embodiment of the invention is explained in greater detail below with reference to figures. Schematically.

The same reference numbers refer to the same objects in the figures unless indicated otherwise.

DETAILED DESCRIPTION OF THE INVENTION

Figure 1:
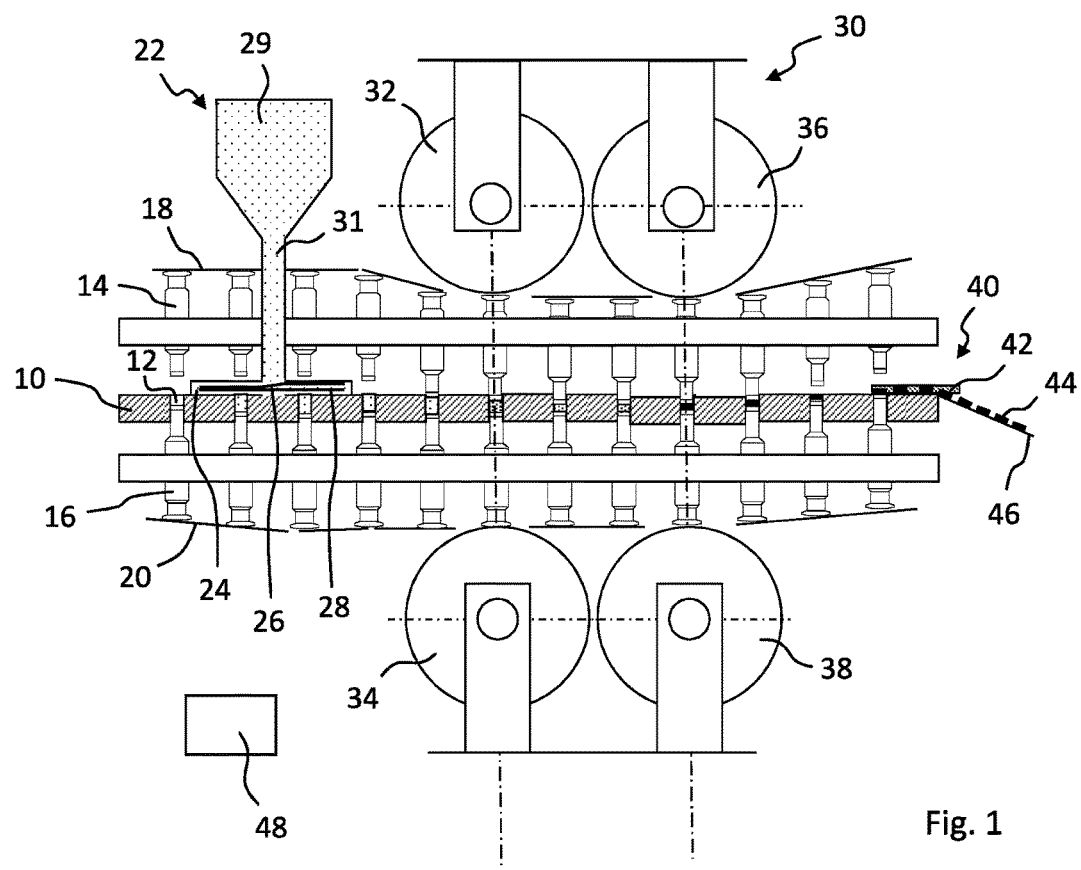
FIG. 1 illustrates a side elevation view of a rotor of an embodiment of a rotary press.
Figure 2:
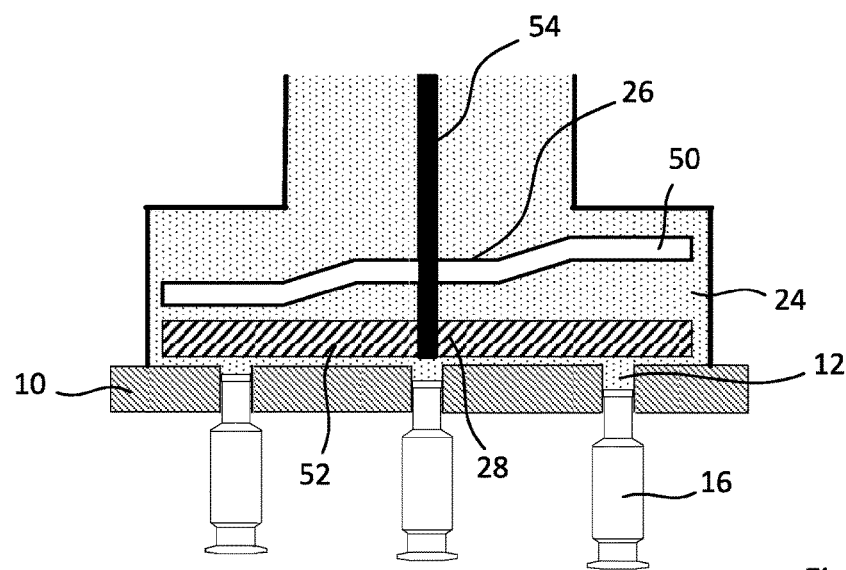
FIG. 2 illustrates an enlarged cross-sectional view of the rotor of the embodiment of the rotary press from FIG. 1.

The rotary press shown in FIGS. 1 and 2, in particular the rotary tablet press, comprises a rotor that is rotationally driven by a rotary drive (not shown) with a die plate 10 which has a plurality of cavities 12. Referring to FIG. 1, the cavities 12 can, for example, be formed by holes in the die plate 10. The rotor further comprises a plurality of top or upper punches 14 and lower or bottom punches 16 that rotate synchronously with the die plate 10. An upper punch 14 and a lower punch 16 are assigned to each cavity 12. The axial movement of the upper punch 14 and lower punch 16, during the rotation of the rotor is controlled by upper control cam elements 18 and lower control cam elements 20. The rotary press moreover comprises a filling apparatus 22 which has a filling chamber 24. As shown in FIG. 1, a first stirrer blade wheel 26 and a second stirrer blade wheel 28 are arranged superimposed in the filling chamber 24. As shown, the stirrer blade wheels 26, 28 are rotatably driven by a common rotary drive. The embodiment of the stirrer blade wheels will be further explained below with reference to FIG. 2. The filling apparatus 22 moreover comprises a filling material reservoir 29 which is connected by a feed section 31 to the filling chamber 24. As shown, the filling material reservoir 29 is funnel-shaped. In an embodiment, the filling material present passes under the force of gravity from the filling material reservoir 29 via the feed section 31 into the filling chamber 24. The filling material may then pass via a filling opening provided in the bottom side of the filling chamber 24 into the cavities 12 of the die plate 10 under the force of gravity.

In an embodiment, the rotary press comprises a pressing station 30. The pressing station 30 possesses a pre-pressing apparatus with an upper pre-pressing roller 32 and a lower pre-pressing roller 34, as well as a main pressing apparatus with an upper main pressing roller 36 and a lower main pressing roller 38. Furthermore, the rotary press comprises an ejector station 40, in the present case with a scraper 42 which supplies the pellets 44, in particular tablets, produced in the rotary press to a pellet discharge 46 for further processing.

A control apparatus for operating the rotary press is shown with reference number 48. The control apparatus 48 is connected by lines (not shown) to, inter alia, the rotary drive of the rotor and the rotary drive of the stirrer blade wheels 26, 28 of the filling apparatus 22.

Referring to FIG. 2, it can be seen that the first stirrer blade wheel 26 has a plurality of stirrer blades 50 that are connected at the same height to a rotary shaft 54. The stirrer blade wheel 28 also possesses a plurality of stirrer blades 52 which are also connected at the same height to the rotary shaft 54. The stirrer blades 52 of the second stirrer blade wheel 28 are located in a horizontal plane in the example shown in FIG. 2. In particular, no part of the stirrer blades 50 extend in the same direction as the rotary shaft 54. The stirrer blades 52 of the second stirrer blade wheel 28 are made from a flat bar. The stirrer blades 50 of the first stirrer blade wheel 26 contrastingly do not lie in a horizontal plane, but are rather offset in each case. Moreover, the stirrer blades 50 of the first stirrer blade wheel 26 are made from a round bar.

During operation of the rotary press, the rotor is rotatably driven at a rotor rotary speed set by the control apparatus 48. At the same time, the stirrer blade wheels 26, 28 are rotatably driven at a rotary speed controlled by the control apparatus 48. During the rotation of the die plate 10, the cavities 12 run below the filling opening in the filling chamber 24. As explained, the filling material to be pressed is added to the cavities 12 through the filling opening. The filling height is specified by the bottom punches 16 which partially enter the cavities 12. In the region of the pressing station 30, the filling material located in the cavities 12 is pressed by the upper punches 14 and lower punches 16, i.e., successively by the pre-pressing rollers 32, 34 and main pressing rollers 36, 38. After pressing the filling material, the upper punches 14 can be withdrawn from the cavities 12, and the produced pellets 44 are ejected by the lower punches 16 onto the top side of the die plate 10 such that they are scraped off of the top side of the die plate 10 by the scraper 42 and supplied to the pellet discharge 46 for further processing.

As shown, the different configurations or designs of first rotatably driven stirrer blade wheel 26 and the second rotatably driven stirrer blade wheel 28 ensure optimum loosening of the filling material in the filling chamber 24 on the one hand, and optimum transportation of the filling material into the cavities 12 on the other hand.

REFERENCE NUMBER LIST

10 Die plate
12 Cavities
14 Top punches
16 Bottom punches
18 Upper control cam elements
20 Lower control cam elements
22 Filling apparatus
24 Filling chamber
26 First stirrer blade wheel
28 Second stirrer blade wheel
29 Filling material reservoir
30 Pressing station
31 Feed section
32 Upper pre-pressing roller
34 Lower pre-pressing roller
36 Upper main pressing roller
38 Lower main pressing roller
40 Ejector station
42 Scraper
44 Pellets
46 Pellet discharge
48 Control device
50 Stirrer blade
52 Stirrer blade
54 Rotary axis

The invention claimed is:

1. A filling apparatus for filling cavities in a rotary press, the filling apparatus comprising:
   a filling material reservoir;
   a filling chamber connected to the filling material reservoir and having a filling opening configured to allow filling material to pass through;
   a first rotatably driven stirrer blade wheel having at least one stirrer blade; and
   a second rotatably driven stirrer blade wheel having at least one stirrer blade;
   wherein the first rotatably driven stirrer blade wheel and the second rotatably driven stirrer blade wheel are disposed in the filling chamber,
   wherein the at least one stirrer blade of the first rotatably driven stirrer blade wheel has at least one of a different geometry, a different direction of rotation, and a different rotary speed, than the at least one stirrer blade of the second rotatably driven stirrer blade wheel, and
   wherein the first rotatably driven stirrer blade wheel and the second rotatably driven stirrer blade wheel are disposed along a common rotary axis in the filling chamber.

2. The filling apparatus according to claim 1, wherein the first rotatably driven stirrer blade wheel and the second rotatably driven stirrer blade wheel are rotatably driven on concentric rotary shafts.

3. The filling apparatus according to claim 1, wherein the at least one stirrer blade of one of the first and second rotatably driven stirrer blade wheels comprises a flat bar.

4. The filling apparatus according to claim 3, wherein the at least one stirrer blade of one of the first and second rotatably driven stirrer blade wheels comprises a round bar.

5. The filling apparatus according to claim 4, wherein the at least one stirrer blade comprising the round bar is disposed in the filling chamber above the at least one stirrer blade comprising the flat bar.

6. The filling apparatus according to claim 1, wherein the at least one stirrer blade of the first and second rotatably driven stirrer blade wheels each lie in different planes.

7. The filling apparatus according to claim 1, wherein the at least one stirrer blade of one of the first and second rotatably driven stirrer blade wheels has one or more offsets.

8. The filling apparatus according to claim 1, further comprising one or more additional rotatably driven stirrer blade wheels disposed in the filling chamber, the one or more additional rotatably driven stirrer blade wheels having at least one of a different geometry, a different direction of rotation, or a different rotary speed, than the first and second rotatably driven stirrer blade wheels.

9. The filling apparatus according to claim 1, further comprising at least a second filling chamber connected to the filling material reservoir and having a filling opening configured to allow filling material to pass through, the second filling chamber comprising at least one rotatably driven stirrer blade wheel.

10. The filling apparatus according to claim 1, further comprising a control apparatus configured to control rotary speed and direction of rotation of the first and the second rotatably driven stirrer blade wheels.

* * * * *